United States Patent [19]

Damm et al.

[11] 3,838,321

[45] Sept. 24, 1974

[54] SPEED CONTROL SYSTEM

[75] Inventors: David A. Damm, Toledo; Gerald F. Scherf, Holland, both of Ohio

[73] Assignee: Owens-Illinois, Inc., Toledo, Ohio

[22] Filed: Oct. 24, 1973

[21] Appl. No.: 409,252

[52] U.S. Cl. ................ 318/66, 318/77, 318/327
[51] Int. Cl. ..................... H02p 5/46, H02p 5/00
[58] Field of Search ..................... 198/31; 318/326–328, 66–70, 77, 336, 396–398

[56] References Cited
UNITED STATES PATENTS

| | | | |
|---|---|---|---|
| 1,506,446 | 5/1922 | Rogers | 318/328 |
| 3,084,307 | 4/1963 | Landis | 318/328 |
| 3,206,664 | 9/1965 | Lilly | 318/67 |
| 3,206,665 | 9/1965 | Burlingham | 318/327 |

*Primary Examiner*—Robert K. Schaefer
*Assistant Examiner*—John Feldhaas
*Attorney, Agent, or Firm*—Steve M. McLary; E. J. Holler

[57] ABSTRACT

A motor speed control for a plurality of machines operating in parallel. In the inspection of glass containers, a group of containers are split into individual lines, three for example. Each line is fed to a separate inspection machine where identical inspection functions are performed. This invention is a control system for the electric motor drives of the inspection machines. The speed of all of the machines is monitored, and whenever any machine stops or falls below a minimum speed, the remaining machines are automatically increased in speed to an emergency speed. The remaining machines can operate fast enough to inspect all of the glass containers, which, under these circumstances, are divided into only two lines instead of three.

41 Claims, 8 Drawing Figures

3,838,321

SPEED CONTROL SYSTEM

BACKGROUND OF THE INVENTION

This invention generally relates to electric motor speed controls. More particularly, this invention relates to a two-speed motor control system for electric motors operating in a parallel configuration. Specifically, this invention relates to a speed control system for the electric motor drive of a plurality of inspection machines which will hold a normal operating speed and will automatically shift the speed of remaining machines to a faster, emergency speed whenever any one of the machines stops.

This control system is particularly adapted for use with glass container inspection machines such as that shown in U.S. Pat. No. 3,313,409, the teachings of which are hereby incorporated by reference. These inspection machines are frequently used in groups of two of three to inspect the output from a single glass container manufacturing machine. It is necessary to use more than one inspection machine, because of the increasing rates of production of glass containers. The inspection machine described typically will be unable to run at a speed sufficient to inspect all of the output of a glass container manufacturing machine. Therefore, at the output of the annealing lehr, the mass of glass containers is split into two or more lines for inspection by multiple inspection machines. In such a multiple machine configuration, it is possible that one or more of the machines may jam and stop or must be shut down for repair or adjustment of the inspection apparatus. Under normal circumstances, when this occurs, the remaining machine or machines is unable to inspect the entire output of the glass container forming machine. This leads to a generation of backlog of containers waiting to be inspected. The purpose of this invention is to allow the remaining machine or machines to automatically operate at a higher speed for short periods of time to accept the entire output of the glass container forming machine for inspection, while one inspection machine is temporarily out of service. It should be realized that the utility of this invention is not limited strictly to glass container inspection machinery, but can be utilized in any process in which multiple machines process single lines of articles, and one or more of the machines must be periodically removed from service. In any circumstance in which the remaining machines can accept the entire flow of material, this invention may be utilized. This invention could also be utilized in a situation wherein the speed of all motors should be decreased, rather than increased, in the event of failure of one or more motors.

SUMMARY OF THE INVENTION

My invention is an apparatus for controlling the speed of operation of a plurality of machines which perform substantially identical operations, in a parallel fashion, on a plurality of substantially identical articles which are fed thereto and removed therefrom. Each machine has a main drive motor and an electrically adjustable speed control unit for the motor. A means for sensing the speed of each drive motor is provided. Suitable means is provided for setting a pre-selected normal operational speed and an emergency operational speed, greater than the normal speed, for each of the drive motors. Sensing means is used to determine when the speed of any one of the drive motors falls below a pre-selected minimum speed value. A logic means generates a first signal when all of the sensed speeds are above the pre-selected minimum speed value and a second signal when any one of the sensed speeds is below the pre-selected minimum speed value. Finally, a means, connected to the speed control units, is provided for individually comparing the sensed speed of each motor with the normal operational speed when the first signal is present and with the emergency operational speed when the second signal is present and for generating a speed correctional signal to the speed control units whenever the sensed speed varies from the compared pre-selected speed value.

DETAILED DESCRIPTION OF THE DRAWINGS

Figure 1:
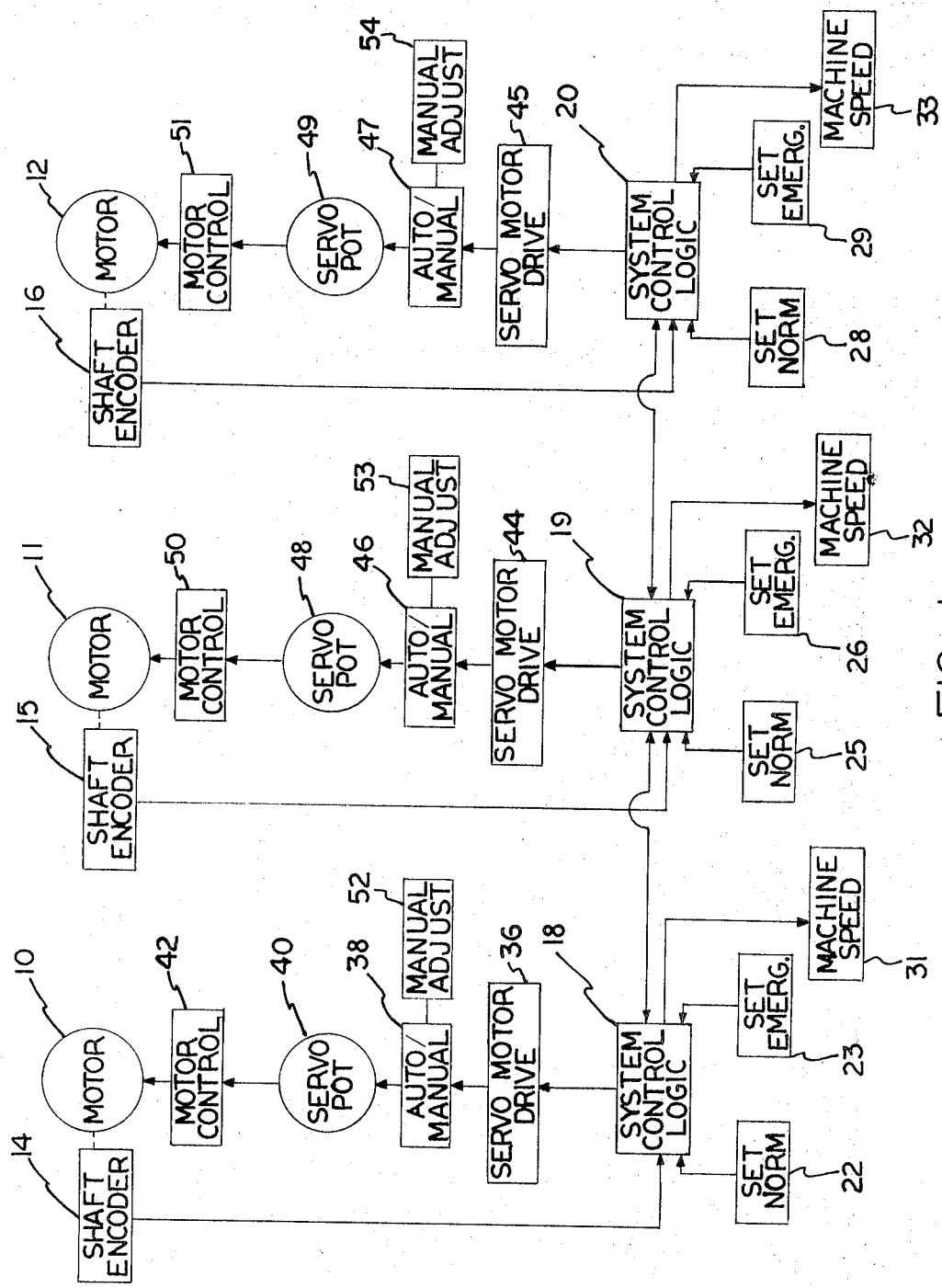
FIG. 1 is a schematic diagram of the speed control system of the present invention as applied to three motors.

Before beginning the description of the drawing figures, it is necessary to explain the techniques used in making these drawings. First, conventional drafting practice is used in showing the interconnection of the components of this system. Where electrical wiring lines cross one another without intersecting or connecting, the crossing is simply shown as one line passing over another. Where lines do intersect or connect, the intersection point is indicated by a shaded circle. The connection of circuit components to the power supplies of the circuit are not indicated. This is conventional circuit drawing practice, and the connection to power supplies of the active components of the circuit should be apparent to one skilled in the art. The description of the logic in the circuit is generally done in terms of negative logic; that is, a logic system in whch the absence of a signal indicates an action to be taken, rather than the presence of a signal indicating an action to be taken. However, this particular convention is simply for convenience, and it should be readily apparent that the entire logic of the system could be operated in the inverse mode if so desired.

With specific reference to FIG. 1, one particular configuration of the present invention is illustrated. In this particular configuration, three glass container inspection machines of the type described are utilized. Each of these three machines has a main drive motor respectively designated as elements 10, 11 and 12. An output shaft of the three drive motors 10, 11 and 12 is coupled to a shaft encoder 14, 15 and 16 for the respective drive motors 10, 11 and 12. The shaft encoders 14, 15 and 16 are of conventional design well known in the art, which produce a series of pulses during the revolution of the drive shaft. The characteristics of the drive shaft are such that is completes one revolution for each glass container which is inspected. The shaft encoders 14, 15 and 16 produce one thousand pulses for each revolution of the drive shaft, as well as a single reference pulse which is generated at the beginning of each revolution of the shaft. It was discovered that, while the speed of rotation of the drive shaft is on the average a constant value, the speed does fluctuate somewhat during each revolution, thus making it necessary to begin the series of one thousand pulses at a common known reference point for each measurement that is made. The shaft encoders 14, 15 and 16 are connected to individual system control logic units 18, 19 and 20, each associated with one of the main drive motors 10 through 12. The logic units 18 through 20 are all interconnected to allow sensing of the removal from operation or stopping of one of the main drive motors 10 through 12. As an input to the logic unit 18, a normal speed set point unit 22 is connected and an emergency speed set point unit 23 is connected. This gives the two values which the logic unit 18 compares with the actual speed of the motor 10 as represented by the pulses generated by the shaft encoder 14. Likewise, a normal speed set point unit 25 and an emergency speed set point unit 26 are connected to the logic unit 19, and a normal speed set point unit 28 and an emergency speed set point unit 29 are connected to the logic unit 20. A digital machine speed display unit 31 is connected to an output of the logic unit 18 to allow ready visual reading of the actual speed of the machine driven by the motor 10. The logic units 19 and 20 also have respective digital machine speed display units 32 and 33. The logic units 18 through 20 monitor the speed of the motors 10 through 12 and, when correction is necessary, generate a correction signal to increase or decrease the speed of the motors 10 through 12. In the case of the logic unit 18, the correction signal is transmitted to a servomotor drive 36. This signal, in turn, passes through a two-position automatic or manual switch 38 to adjust the setting of a servopotentiometer 40. The setting of the servopotentiometer 40, in turn, corrects a motor controller 42 for the motor 10 and increases or decreases the speed of the motor 10 in order to hold either the normal set point or the emergency set point, depending on the operational mode at that time. The servomotor drive 36, the servopotentiometer 40 and the motor controller 42 make up an electrically adjustable speed control unit for the motor 10. The control scheme for the motors 11 and 12 is basically the same as that for the motor 10. These also have respective servomotor drives 44 and 45, two-position switches 46 and 47, servopotentiometers 48 and 49, and motor or control units 50 and 51. The two-position switches 38, 46 and 47 are provided as a means to allow manual control of the motor speeds if desired. With the switches 38, 46 and 47 set in the automatic mode, signals from the system logic units 18 through 20 are processed through to control the motors 10 through 12. With the switches 38, 46 and 47 in the manual setting, a manual adjustment unit 52 for the motor 10, 53 for the motor 11, and 54 for the motor 12, may be used to manually adjust the speed of the motors 10 through 12.

Figure 2:
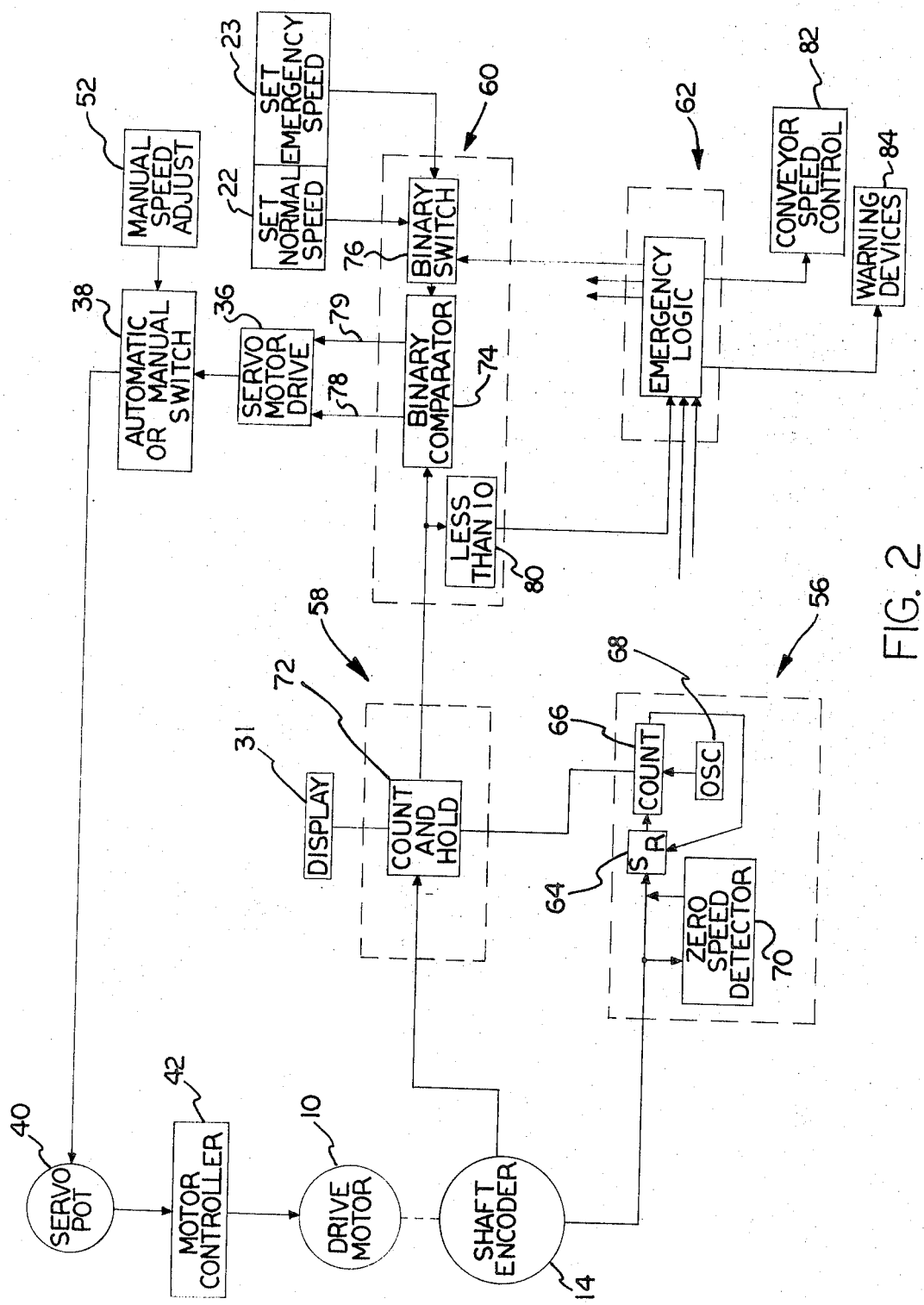
FIG. 2 is a schematic diagram of the control system, in more detail than FIG. 1, for a single, typical, one of the motors of FIG. 1.

In FIG. 2, the logic unit 18 for the drive motor 10 is shown broken into its component circuits. The illustration of FIG. 2 is by way of example of the logic units which are common to the drive motors 10, 11 and 12. That is, the logic units 18, 19 and 20 are all substantially identical to that shown in FIG. 2. The logid unit 18 has three major components: a time base generator 56, a tachometer 58, and a comparator 60. An emergency unit 62 is a unit which is common to all three of the logic units 18 through 20. It is the emergency unit 62 which interconnects all of the logic units 18 through 20. However, it is shown in FIG. 2 to illustrate its connection to the time base unit 56, tachometer 58 and comparator 60 of the logic unit 18 and to illustrate the general interconnection of the emergency unit 62 to all of the logic units 18 through 20. The single reference pulse generated per revolution of the drive shaft of the motor 10 by the shaft encoder 14 is transmitted to the time base generator 56. The reference pulse activates a flip-flop 64, which, in turn, allows a hexadecimal counter 66 to begin counting in response to pulses generated by a free-running oscillator 68. The output of the counter, when it reaches it maximum capacity, is connected to the reset terminal of the flip-flop 64 to turn the flip-flop 64 off and thus immobilize the counter. In addition, the time base generator 56 also contains a zero speed detector 70 which is connected to the single reference pulse, and is used to clear the display unit 31 when the speed of the drive motor 10 goes to zero. The output of the counter 66 is connected to a count-and-hold unit 72 contained within the tachometer unit 58. The tachometer unit 58 is designed to display, as an output, the actual speed in bottles per minute of the inspection device driven by the drive motor 10. Also connected to the count-and-hold unit is the one thousand pulse per revolution output of the shaft encoder 14. The time base generator 56, the shaft encoder 14, and the tachometer unit 58, in sum, serve as a means for sensing the speed of operation of the motor 10. The output of the count-and-hold device and the tachometer unit 58 is connected to a binary comparator 74 contained within the comparator unit 60. Another input to the binary comparator 74 is through a binary switch 76. The binary switch 76 has connected to it the normal speed set unit 22 and the emergency speed set unit 23. The speed setting which the binary comparator 74 compares with the output from the count-and-hold unit 72 is determined by the setting of the binary switch 76. The binary switch 76 will pass either the emergency speed value or the normal speed value, depending on the signal it receives from the emergency logic unit 62. The binary comparator 74 has two output lines 78 and 79 connected to the servomotor drive 36. The output line 78 will cause the servomotor drive to act to increase the speed of the drive motor 10, while the output line 79 will cause the servomotor drive 36 to tend to decrease the speed of the drive motor 10. The binary comparator 74 will compare its two input values and determine whether the speed of the drive motor 10 needs to be increased, decreased or whether it should be held the same. In the event the speed of the drive motor 10 is that which it should be, no output signal will result. The output of the count-and-hold unit 72 is also connected to a less-than-ten unit 80, again a part of the comparator unit 60. The less-than-ten unit 80 is designed to generate an output signal when the speed of the drive motor 10 drops below 10 bottles per minute. This is considered to be a critical value, and for all practical purposes of operation, should be considered to be a zero speed of operation. Thus, the less-than-ten unit 80 is a sensing means for sensing when the speed of the motor 10 falls below a pre-selected minimum operational speed. The less-than-ten unit 80 generates an output which is connected to the emergency logic unit 62; this signal will control the motors 11 and 12. The logic units 19 and 20 also have less-than-ten units. When a signal from one of these less-than-ten units is received by the emergency logic unit 62, an output is generated and transmitted to the binary switch 76. When the signal is received by the binary switch 76, it switches the input to the binary comparator 74 from the normal speed of operation to the emergency speed of operation, thereby generating a relatively large error signal to the servo-motor drive 36, consequently causing the drive motor 10 to operate at a higher speed. It will be noted that two additional output lines are shown from the emergency logic unit 62 as well as the additional input lines. These two additional input and output lines would be connected to the logic units 19 and 20 for the drive motors 11 and 12. Therefore, the emergency logic unit 62 is a logic means which will generate a first signal when all of the motor speeds are above the pre-selected minimum speed, 10 bottles per minute in this example, and a second signal when any one of the several motor speeds is below the minimum value. In addition, the binary comparator 74 and binary switch 76 combination gives a comparison means for comparing the normal set speed with the sensed speed when the first signal is present and the emergency speed with the sensed speed when the second signal is present and generating an appropriate output correctional signal whenever the sensed speed varies from whichever set speed it is being compared with. There are two other outputs shown from the emergency logic unit 62. One of these may be connected to a conveyor speed control unit 82. The output of the inspection machine shown in the previously referenced patent is a single line conveyor on which the glass containers travel. If the speed of operation of the inspection device is increased, it may be necessary to increase the speed of the output conveyor to maintain stable operation. Therefore, under some circumstances, the emergency logic unit 62 may generate an output signal when the speed of any one machine drops below 10 bottles per minute to the conveyor speed control 82 to cause the output conveyors of any remaining inspection machines to increase in speed. Another output from the emergency logic unit 62 may be to a number of warning devices such as lights or sirens, which are designated as 84.

Figure 3:
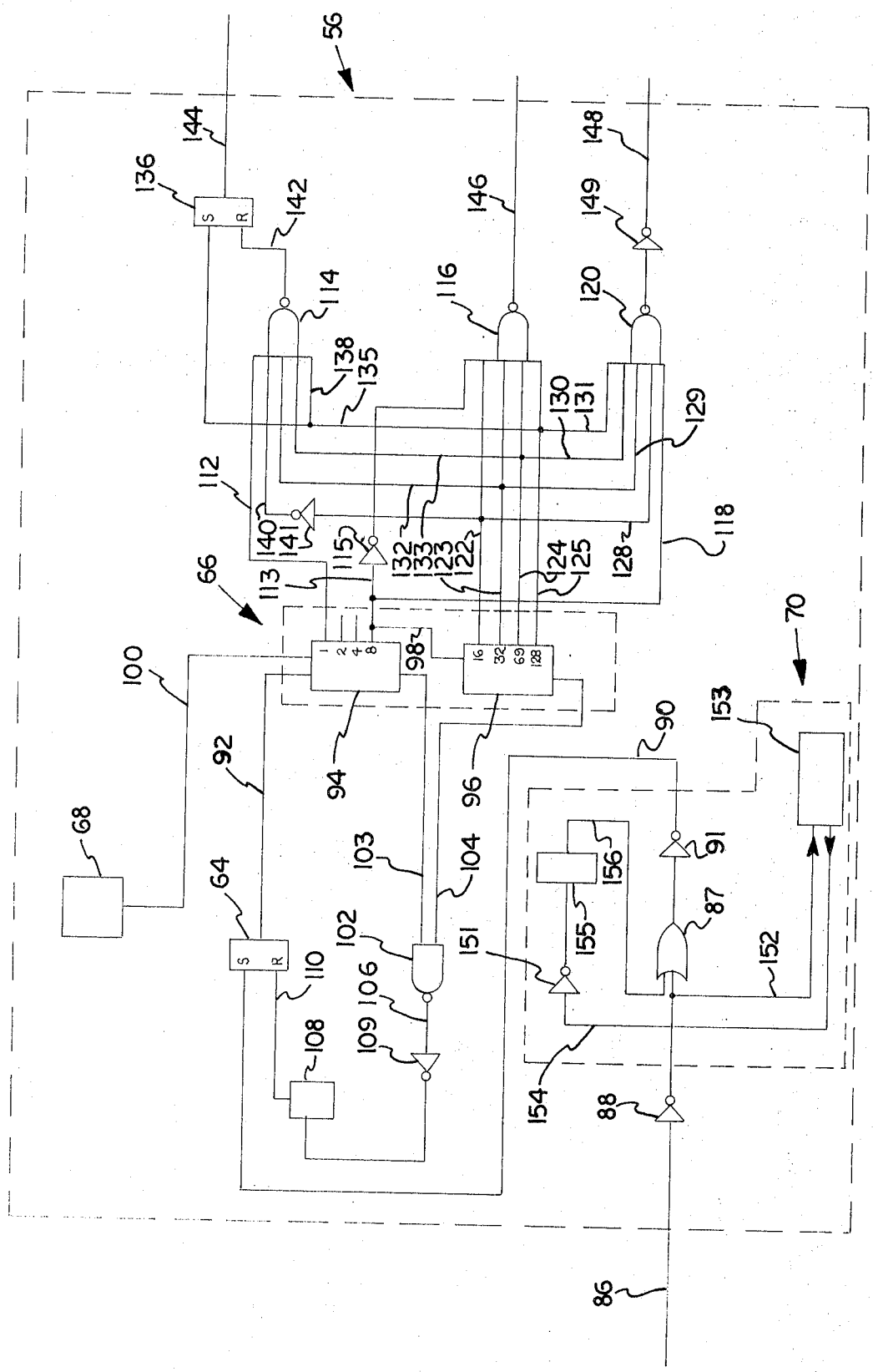
FIG. 3 is a circuit diagram for the time base generator of FIG. 2.

A detailed schematic circuit diagram of the timebase generator 56 is shown in FIG. 3. The reference pulse from the shaft encoder 14 is transmitted through an input line 86 to one of the input terminals of a two-input terminal NOR gate 87. A signal inverter 88 is connected in series in the line 86 prior to the NOR gate 87. The output of the NOR gate 87 is connected through an output line 90 to the set terminal of the flip-flop 64. A signal inverter 91 is connected in series in the output line 90. The output of the flip-flop 64 is connected through an output line 92 to one input of the binary counter 66. The counter 66 may be seen in FIG. 3 to be made up of a two-stage cascaded binary counter. A first stage 94 has a storage capacity of 16 and a second stage 96 likewise has a storage capacity of 16. However, as is conventional with such counters, the total storage capacity of the counter 66 is 256 counts. The first stage has output terminals corresponding to bits of 1, 2, 4 and 8. When the first stage 94 is full, an output signal is generated on a wire 98 which is connected to the second stage 96. This, then, puts the sixteen count into the second stage 96. The second stage then has four output bits which correspond to counts of 16, 32, 64 and 128. This type of counter is completely conventional in the art, and any further discussion is deemed unnecessary. A second input to the first stage 94 of the counter 66 is through an output line 100 connected to the oscillator 68. The oscillator preferably operates at a frequency of 3,750 hertz. This relatively high frequency of operation is dictated, as was previously mentioned, by the variations in the actual speed of rotation of the drive shaft of the motor 10 during one complete cycle. A relatively high frequency of oscillation tends to overcome these variations in speed by measuring the speed of operation in a fairly short time span. When the first stage 94 of the counter 66 is filled, a carry-over pulse is generated and transmitted from the first stage 94 to a NAND gate 102 through a wire 103. When the second stage 96 of the counter 66 is filled, a carry-over pulse is generated and transmitted from the second stage 96 to the NAND gate 102 over a wire 104. The counting sequence is started by the reference pulse which enters the time base generator 56 through the line 86. This signal then turns on the flip-flop 64 which, in turn, allows the counter 66 to begin accepting pulses from the oscillator 68. When both stages of the counter 66 have reached their complete capacity, again 256 counts, carry-over pulses are present on both the wires 103 and 104 connected to inputs of the NAND gate 102. When this occurs, an output pulse is generated from the NAND gate 102 on an output line 106, which is connected to a one-shot unit 108. A signal inverter 109 is connected in series in the output line 106. When the one-shot device 108 receives the signal from the line 106, it, in turn, generates a signal on a wire 110 connected to the reset terminal of the flip-flop 64. This signal turns off the flip-flop 64 and thus stops the counter 66 from accepting any further pulses from the oscillator 68. Thus, the counter 66 remains stopped with both stages 94 and 96 filled, a total count of 256 pulses. The counter 66 is "reset" by the next input on either line 92 or line 100, "reset" meaning the counter is overflowed, and its count goes to zero. When the next reference pulse arrives on the line 86, and turns the flip-flop 64 back on, the first pulse on either the line 92 or the line 100 to the counter 66 clears the counter 66 and allows it to begin again storing 256 counts. The one and eight bit output terminals of the first stage 94 of the counter 66 have respective output lines 112 and 113. The two and four bit outputs of the first stage 94 are not used in this particular application and thus have not been assigned a number. The output line 112 is connected to one input of a second NAND gate 114. The output line 113, after passing through a signal inverter 115, is connected to one input terminal of a third NAND gate 116. A line 118 is connected to the line 113, before the signal inverter 115, and is connected to one input terminal of a fourth NAND gate 120. The 16, 32, 64 and 128 bits of the second stage 96 of the counter 66 have respective output leads 122, 123, 124 and 125 connected to inputs of the third NAND gate 116. Branch wires 128, 129, 130 and 131 respectively connect output wires 122, 123, 124 and 125 to input terminals of the fourth NAND gate 120. Branch wires 132 and 133 connect output wires 123 and 124 to input terminals of the second NAND gate 114. A branch wire 135 connects the output wire 125 to the set terminal of a second flip-flop 136. A branch line 138 connects the branch wire 135 to another input terminal of the second NAND gate 114. A final input connection to the second NAND gate 114 is a branch line 140 which connects an input of the NAND gate 114 to the output line 122. A signal inverter 141 is connected in series in the branch line 140. The output of the second NAND gate 114 is connected through an output line 142 to the reset terminal of the second flip-flop 136. Connected to the inputs of the second NAND gate 114 are therefore, the 1 bit, the 32 bit, the 64 bit, the 128 bit and a not 16 bit from the counter 66. When the counter 66 is cleared to begin a new count, the 128 bit goes from a value of one to zero. This transition, then, sets the second flip-flop 136, and a signal is transmitted through an output line 144 from the second flip-flop 136. This signal will then remain on until the counter 66 has reached a count of 225. This value is readily arrived at by simply summing the values of the inputs to the second NAND gate 114. 128 plus 64 plus 32 plus 1 equals 225. The not 16 value is used to assure that the switching occurs at the proper time. At the time the value of the counter is 225, the value of the 16 bit will be zero. The signal inverter 141 transforms this into a "one" value to assure that the NAND gate 114 has all of the inputs necessary to switch the flip-flop 136 off. This occurs, then, when the count has reached a value of 225 as a result of the signal on the line 142 into the reset terminal of the flip-flop 136. Therefore, the signal transferred along the output line 144 is of a known duration. Since the frequency of oscillation of the oscillator 68 is known to be 3,750 hertz, 225 counts is a precisely known period of time. This period of time is then used to actually calculate the speed of the inspection machine. It is necessary to generate two further signals for proper operation of the speed function. The inputs to the third NAND gate 116 are the 16, 32, 64, and 128 bits and a not 8 bit. The sum of 16, 32, 64 and 128 is 240. Therefore, the third NAND gate 116 will generate an output signal along its output line 146 only when the value held by the counter 66 is 240. The signal will come on at the time the counter reads 240. At this time, the value of the 8 bit will be zero, since no value will be held in the first stage 94. The first stage will continue to receive counts and on the 8th pulse received by the first stage 94 from the oscillator 68, the 8 bit will assume the "one" or on state. At this time, the signal inverter 115 will then provide a zero signal to the second NAND gate 116, turning off the second NAND gate 116. Therefore, a pulse which lasts from 240 to 247 counts will be transmitted along the output line 146. The fourth NAND gate 120 has an output line 148 which has a signal inverter 149 connected in series with it. The inputs to the fourth NAND gate 120 are the 8, 16, 32, 64 and 128 bits. The only time when all of these bits will be on is when the count in the counter 66 reaches 248, the sum of all of the inputs to the fourth NAND gate 120. The fourth NAND gate 120 will then remain on until the next cycle begins which will clear the counter and provide a zero in all of the bits of the counter 66. Returning now to the input lead 86 which carries the reference pulse into the time base unit 56, a wire 152 connected to the input lead 86 is connected to a timer 153. The timer 153 has a cycle period of approximately 5 seconds. So long as a pulse is regularly received through the input lead 86 and the wire 152 to the timer 153, the timer 153 will not be allowed to generate an output pulse. However, should the machine with which this particular zero speed device 70 is associated not produce a reference pulse within the five second period, the timer 153 will generate an output signal along an output line 154. A signal inverter 151 is inserted in series in the output line 154. The wire 154 is connected to a one-shot device 155, which, in response to this signal, generates a single output pulse on a wire 156 connected to the NOR gate 87. This signal into the NOR gate 87 is interpreted in the same manner as a pulse coming along the line 86 would be interpreted. That is, it causes the entire counting sequence to begin. However, this is a final count sequence used to ensure that an improper speed number is not displayed on the display unit 31 after a machine has reached a stopped or zero speed condition.

Figure 4:
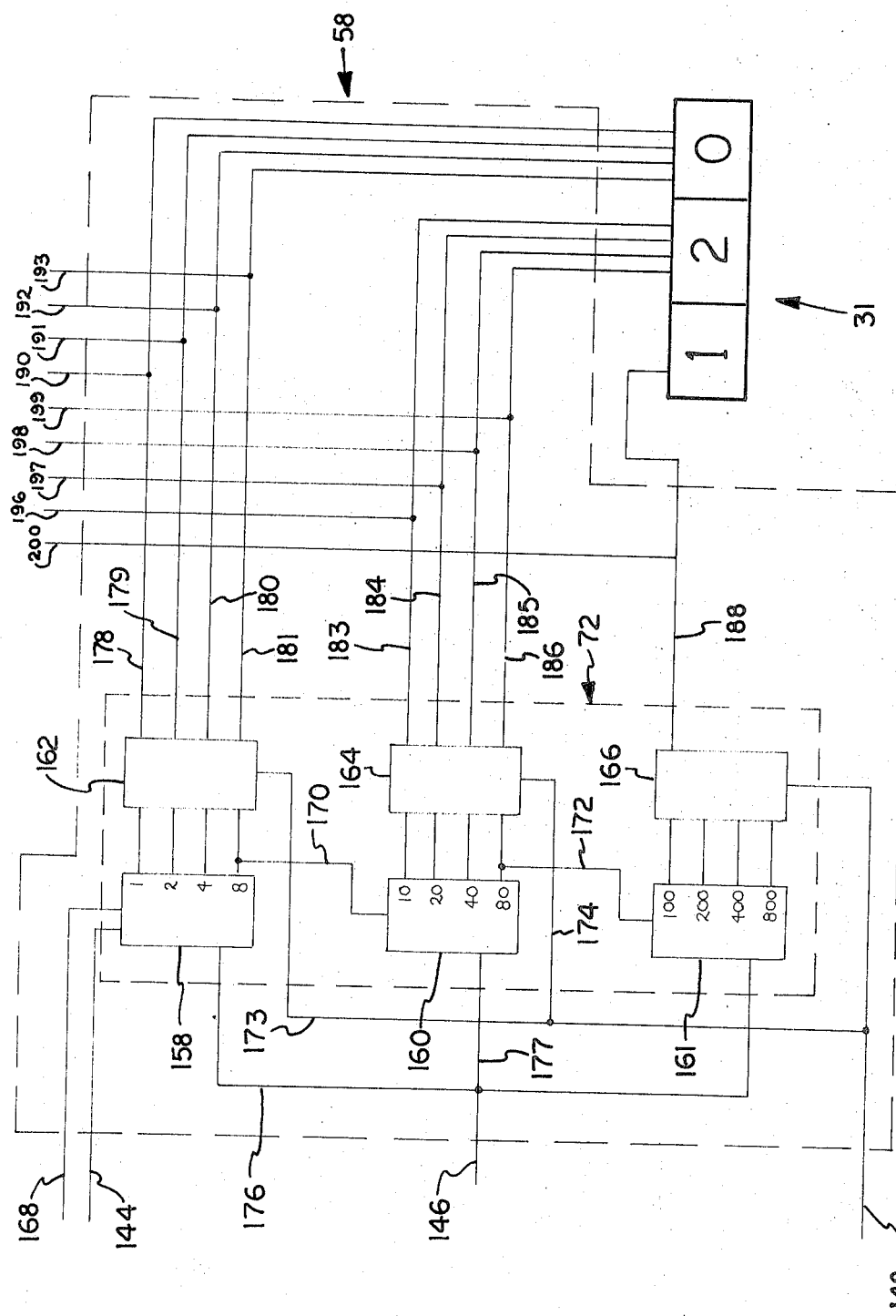
FIG. 4 is a circuit diagram for the tachometer unit of FIG. 2.

FIG. 4 shows a detailed schematic circuit diagram of the tachometer unit 58. The count-and-hold device 72 is actually made up of two major components. First, there is a three-stage binary coded decimal counter, which has a units stage 158, a tens stage 160, and a hundreds stage 161. Each stage of the binary coded decimal counter is designed to overflow when it reaches a capacity which is some multiple of ten. In this respect, it varies from the hexadecimal counter used in the time base unit 56 which overflowed when each stage reached a multiple of 16. The units stage 158 is connected to a quad-latch unit 162. The tens stage 160 is connected to a second quad-latch unit 164. The hundreds stage 161 is connected to a third quad-latch unit 166. The three quad latches 162, 164 and 166 are all commercially available, well-known units, such as a Teledyne H:NIL Model 370AL, which will hold and produce as an output a previous logic state presented to them. These units may then be cleared and instructed to accept the input state then presented to them as new states which they then hold and present as an output until the next series of input states are inserted into them. In operation, the zero to 225 time base generated by the time base unit 56 is introduced through the output line 144 into the units stage 158. An output line line 168 from the shaft encoder 14 transmits the one thousand pulse per revolution signal into the units stage 158. So long as a signal is furnished on the line 144 to the units stage 158, the units stage 158 will continue to count pulses furnished on the line 168. When the units stage 158 has reached its capacity of 9, a carry-over signal is generated on an output line 170 connected to the tens stage 160. This, then, sets the 10 in the tens stage 160 and allows the units stage 158 to begin counting to its capacity again. Similarly, an output line 172 connects the tens stage 160 to the hundreds stage 161 to allow the hundreds stage 161 6o achieve its maximum storage capacity also. Thus, the total capacity of the hundreds, tens and units stages 161, 160 and 158 respectively, is a total count of one thousand. In this particular installation, though, the speeds of the machines are such that a maximum top speed of 199 units per minute is possible. Therefore, only the one hundred output of the hundreds stage 161 is utilized, although it is quite evident that the other outputs could be utilized if the speed of the particular machines being controlled so permitted. At this stage, it should be noted that although the number is a decimal number in the sense that it has a hundreds, a tens and a units place, the output of the hundreds, tens and units stages are still basically binary numbers and the outputs are in terms of 1, 2, 4 or 8. The counter stages will continue to count pulses furnished by the line 168 so long as the signal on the line 144 is on. When this signal goes off, the counting will stop and the counters will hold the number which they had previously reached. This number will be the number of pulses which occur within a specified time limit. The next signal to reach the tachometer unit 58 is presented by the line 148. This signal occurs after the signal on the line 144 has shut off and the counters have reached a fixed value. The signal on the line 148 is transmitted to the first, second and third quad latches 162, 164 and 166, through branch lines 173 and 174. This signal tells the quad-latch units to release the value which they have previously held and accept the new value which is presented by the units stage 158, tens stage 160 and hundreds stage 161. This value is then accepted by the quad-latch units, the old value erased and the new value is presented as an output on the output lines from the first, second and third quad latches 162, 164 and 166. The final signal to reach the tachometer unit 58 is on the line 146. This signal is transmitted to the units stage 158, the tens stage 160 and the hundreds stage 161, resetting the stages 158, 160 and 161 to the zero state to allow a new count to be achieved for the next cycle of measurement. Branch lines 176 and 177 respectively connect the units stage 158 and the tens stage 160 to the line 146. The first quad-latch unit 162 has four output lines 178 through 181. The second quad-latch unit 164 has four output lines 183 through 186. The third quad-latch unit 166 has only a single output line 188, since, as was previously noted, it is desired to read a number no larger than 199 for this particular application. It is therefore not necessary to provide output lines for the 200, 400 and 800 bits from the hundreds stage 161 of the counter. The output lines 178 through 181 are connected to the units portion of the display unit 31. The output lines 183 through 186 are connected to the tens portion of the display unit 31. The output line 188 is connected to the hundreds portion of the display unit 31. In this case, the display unit may be a Hewlitt Packard Model 5882–7500 binary coded decimal-to-decimal display converter. As may be seen in FIG. 4, the number 120 is displayed in decimal fashion by the display unit 31. The following proof explains why the number of pulses counted during the time required for 225 cycles of the free-running oscillator is identically equal to the operational speed of the inspection machine in bottles per minute.

(1 revolution/1,000 counts · (X counts/225 cycles · (3,750 cycles/second) · (60 second/minute) =

[(3,750 × 60)/(1,000 × 225)] X (revolution/minute) = [(225,000)/(225,000)] X (revolutions/minute) =

X (revolutions/minute) = X (bottles/minute)

X is the number of counts received from the 1000 pulse per revolution shaft encoder. Output branch lines 190 through 193 are respectively connected to outputs 178 through 181. Output branch lines 196 through 199 are respectively connected to the output lines 183 through 186. Finally, an output branch line 200 is connected to the output line 188.

Figure 5:
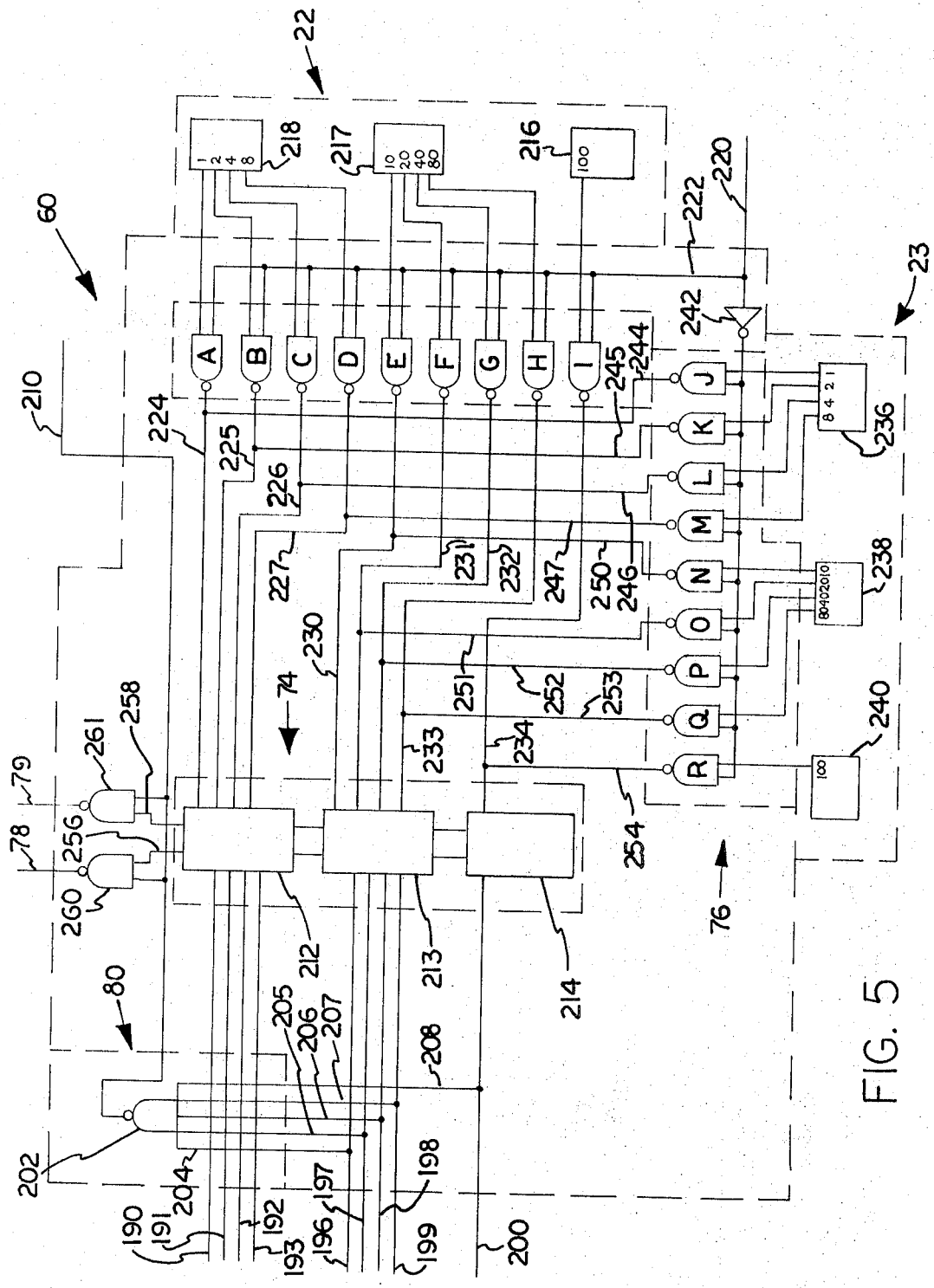
FIG. 5 is a circuit diagram for the comparator unit of FIG. 2.

In FIG. 5, the comparator unit 60 is shown in a schematic circuit detail. The lines 190 through 193, 196 through 199, and 200 are furnished as inputs to the comparator unit 60. The less-than-ten unit 80 is made up of a NAND gate 202 which has five input lines 204 through 208 respectively connected to the lines 196 through 200. Thus, the signal furnished to the NAND gate 202 is a signal which is the tens, twenties, forties, eighties and one hundred bits from the quad-latch units 164 and 166. So long as any one of these signals is present into the NAND gate 202, the speed of the machine is obviously above 10 articles per minute. However, when all the signals disappear, the NAND gate 202 will produce an output signal on the output line 210, which is connected to the emergency logic 62. Such an output indicates that an emergency situation has occurred since the speed of the machine has dropped below 10 articles per minute. The binary comparator 74 is made up of three series-connected binary comparators 212, 213 and 214. Each of these units may be a Teledyne HINIL Model 343L. The binary comparator 212 is connected to the lines 190 through 193 for comparison of the units values. The binary comparator 213 is connected to the lines 196 through 199 for comparison of the tens values. The binary comparator 214 is connected to the line 200 for comparison of the hundreds values. The values furnished by the input lines are actual machine operating values, and they must be compared then with the set point values as provided by the normal speed set unit 22 or the emergency speed set unit 23. Both the normal speed set unit 22 and the emergency speed set unit 23 are made up of several switches which will convert a decimal number which is dialed into them into a binary number output representing the decimal number dialed in. These switches may be Durant Model 49902–407 siwtches. In the normal speed set unit 22, there is a switch 216 for the hundreds place, a switch 217 for the tens place, and a switch 218 for the units place. The 1, 2, 4 and 8 bit outputs of the switch 218 are respectively connected to NAND gates A, B, C and D. The ten, twenty, forty and eighty output bits of the switch 217 are respectively connected to NAND gates E, F, G and H. The one hundred bit output of the switch 218 is connected to a NAND gate I. The emergency logic unit 62 furnishes a signal to the comparator unit 60 through an input line 220. So long as all of the motors 10 through 12 are operating at a speed greater than 10 bottles per minute, the signal on the line 220 will be a logic "one." A branch line 222 is connected to the line 220 and carries the signal on the line 220 to the NAND gates A through I. Thus, so long as the NAND gates A through I receive a signal from their respective switches 216 through 218 and from the line 222 connected to the line 220, there will be an output from the NAND gates A through I. The NAND gates A through D have respective output leads 224 through 227 connected to the first stage 212 of the binary comparator 74. The NAND gates E through H have respective output leads 230 through 233 connected to the second stage 213 of the binary comparator 74. The NAND gate I has an output lead 234 connected to the third stage 214 of the binary comparator 74. The emergency speed set unit 23 is made up of three switches which are identical to the three switches 216 through 218 used with a normal speed set unit. These switches are a units switch 236, a tens switch 238, and a hundreds switch 240. The 1, 2, 4 and 8 bits of the units switch 236 are respectively connected to NAND gates J, K, L and M. The 10, 20, 40 and 80 bits of the tens switch 238 are respectively connected to NAND gates N, O, P and Q. The one hundred bit of the hundreds switch 240 is connected to a NAND gate R. After the incoming signal carried by the line 220 is transmitted through the branch line 222, a signal inverter 242 is inserted in the line 220. Then, the line 220 is connected to all of the NAND gates J through R. It should, therefore, be clear that the signal received by the NAND gates J through R is in the inverse of the signal received by the NAND gates A through I. Thus, under normal operational conditions, a logic "one" signal on the line 220 will cause all of the NAND gates A through I to be on and pass the normal set speed signal. However, the signal inverter 242 will invert this signal to a logic zero and cause the NAND gates J through R to be off. Under emergency operational conditions, the signal on the line 220 will be a logic zero, causing the NAND gates A through I to be off. Inversion of the logic zero by the signal inverter 242 will cause the NAND gates J through R to be on and thereby pass the speed set in the switches 236, 238 and 240, which is the emergency operating speed. The outputs of the NAND GATES J through M are respectively along output leads 244 through 247, which are connected to the lines 224 through 227. The outputs from the NAND gates N through Q are along output lines 250 through 253, which are respectively connected to the lines 230 through 233. The output of the NAND gate R is connected through an electrical line 254 to the line 234. Thus, the signals from the NAND gates J through R may be passed to the comparator stages 212, 213 and 214, when the emergency operational logic condition prevails. The NAND gates A through R and their interconnections and the signal inverter 224 make up the binary switch 76. The comparator 74 thus compares binary outputs furnished by the tachometer unit 58 with those furnished by either the normal speed set unit 22 or the emergency speed set unit 23, depending on which is operational at any time, and generates an appropriate output signal dependent upon the action to be taken. If the two binary numbers are equal, no output signal is generated. If the binary machine speed information is such that the speed of the motor 10 needs to be increased, an output signal is generated on a line 256. If the motor 10 needs its speed decreased, a signal is generated on an output line 258. The line 256 is connected to a second NAND gate 260 and the line 258 is connected to one input terminal of a third NAND gate 261. An input to both the second and third NAND gates 260 and 261 is from the line 210. So long as a signal is present on this line, the speed of the motor 10 is more than 10 bottles per minute, a presumably normal operating condition. It is therefore necessary that both the increase speed or decrease speed signal be present and a signal indicating that the speed of the motor 10 is more than ten bottles per minute before an output will be generated from the NAND gate 260 on the line 78 or from the NAND gate 261 on the line 79. It should be noted that the characteristics of the cascaded binary comparators 212, 213 and 214 are such that signals on the lines 256 and 258 cannot occur simultaneously; the signals are mutually exclusive.

Figure 6:
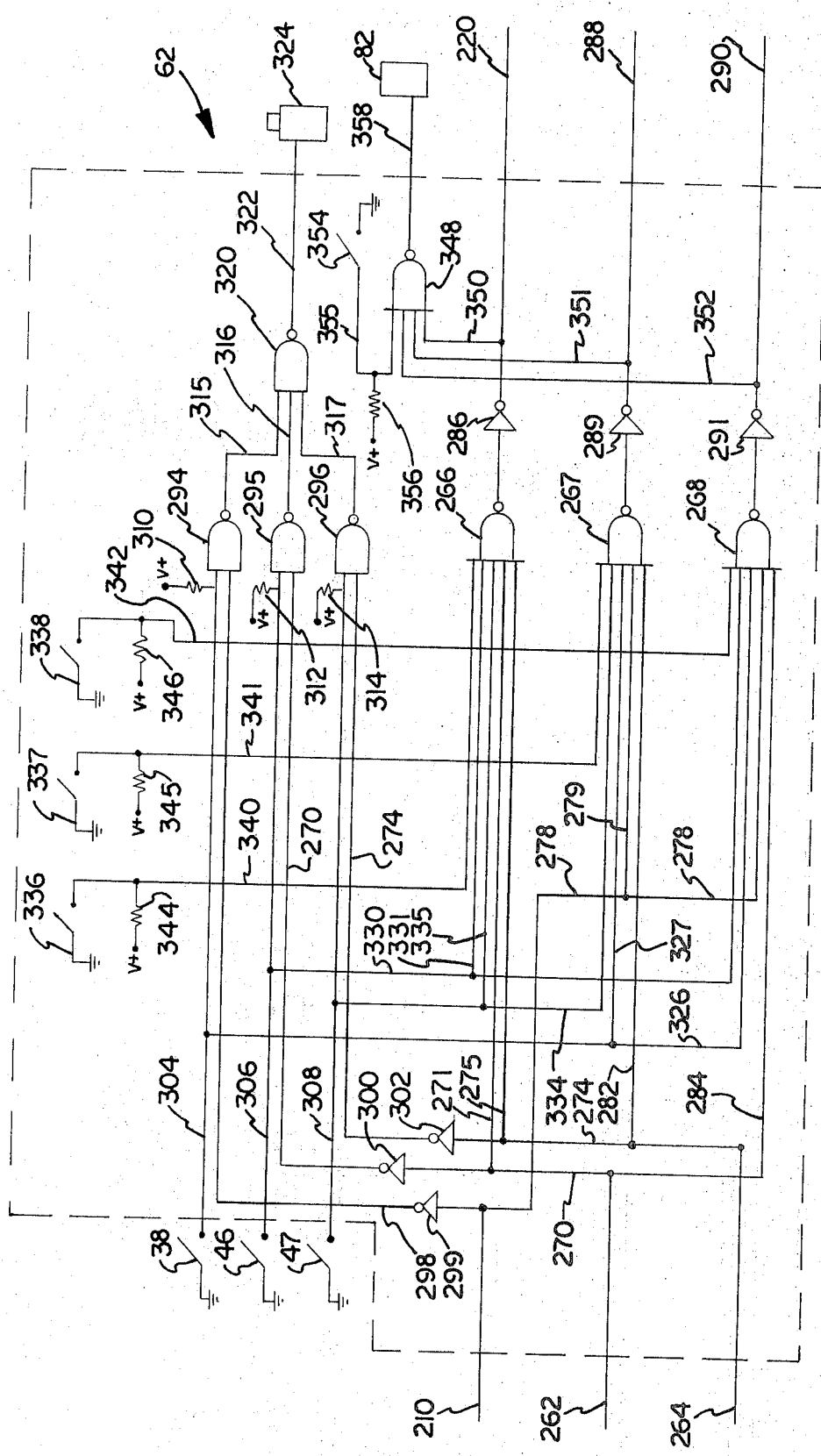
FIG. 6 is a circuit diagram for the emergency logic unit of FIG. 2.

FIG. 6 illustrates the emergency logic unit 62. One input to the emergency logic unit 62 is the line 210 which carries the signal from the comparator unit 60 with the information as to the speed of the drive motor 10. If the drive motor 10 is operating at a speed above 10 bottles per minute, the signal carried by the line 210 is a logic "one" signal. A second input line 262 carries a signal from a comparator unit for the motor 11 with similar information as to the motor speed. A third input line 264 carries information as to the operating speed of the motor 12 from the control circuitry for the motor 12. Thus, the input lines 210, 262 and 264 all carry a logic "one" signal when their motors are operating at a speed greater than 10 bottles per minute. The heart of the logic unit 62 is three NAND gates 266, 267 and 268. The NAND gate 266 is associated with the motor 10, the NAND gate 267 is associated with the motor 11, and the NAND gate 268 is associated with the motor 12. One input to NAND gate 266 is from the input line 262 through a branch line 270 and a second branch line 271. A second input to the NAND gate 266 is from the input line 264 through branch lines 274 and 275. Under normal operational conditions, the signals furnished by the lines 271 and 275 to the NAND gate 266 will be logic "one" signals. The input line 210 is connected to the NAND gate 268 through a branch line 278. A further branch line 279 from the line 278 then serves to connect input line 210 to one input of the NAND gate 267. An electrical line 282 connected to the line 274 connects the input signal on the line 264 to the NAND gate 267. The input line 262 is connected to one input of the NAND gate 268 with an electrical wire 284. Thus, all three of the NAND gates 266 through 268 have one input from each of the other two operating motors. Therefore, if any one of the other two motors reaches a speed less than 10 bottles per minute, the NAND gates 266 through 268 will generate an output pulse or second signal which will then be transmitted to the binary switch 76 which will then cause that motor to operate at the emergency speed. For example, with specific respect to the NAND gate 266, the normal input signals on the lines 271 and 275 will be logic "ones." Therefore, the output of the NAND gate 266 on the line 220 will be a logic zero, assuming the other inputs to the NAND gate 266, which will be discussed later, are also logic "ones". However, an inverter 286 will invert this normal zero signal to a logic "one" which is a first signal, which is then transmitted on the line 220 to the comparator unit 60 as was previously indicated. Similarly, the NAND gate 267 has an output line 288 with an inverter 289 in series in this line and the NAND gate 268 has an output line 290 with an inverter 291 in series in this line. With respect to the other inputs to the NAND gates 266 through 268, consider fourth, fifth and sixth NAND gates 294, 295 and 296. One input to the fourth NAND gate 294 is from the input line 210 through a branch wire 298. A signal inverter 299 in the line 298 inverts the normal logic "one" signal carried by the line 210 to a logic zero signal for input to the fourth NAND gate 294. An input to the fifth NAND gate 295 is through the branch line 270 connected to the input line 262. Note that a signal inverter 300 is inserted in the branch line 270, after the point at which the line 271 is connected to the line 270, again to invert the signal on the line 262 to a logic zero for input to the fifth NAND gate 295. An input to the sixth NAND gate 296 is from the branch line 274 connected to the input line 264. Note that a signal inverter 302 is inserted in the line 274 after the point at which the lines 275 and 282 are connected to the line 274. Thus, the fourth NAND gate 294 is responsive to the speed condition of the motor 10, the fifth NAND gate 295 is responsive to the speed condition of the motor 11, and the sixth NAND gate 295 is responsive to the speed condition of the motor 12. A second input to the fourth NAND gate 294 is a wire or electrical conductor means 304 which is connected to one terminal of the automatic/manual selector swtich 38, the other terminal being grounded. Similarly, the fifth and sixth NAND gates 295 and 296 have input wires 306 and 308 connected to one of their input terminals with the opposite ends of the input wires 306 and 308 being respectively connected to terminals of the automatic/manual selector switches 46 and 47. The other terminals of the switches 46 and 47 are likewise grounded. The switches 38, 46 and 47 may be multiple pole switches. Thus, the poles shown in FIG. 6 are normally open when the machines are in the automatic position. It is apparent, of course, from preceding discussions, that other poles of the switches 38, 46 and 47 must be closed in order to pass the speed correctional signals. A positive voltage supply V+ is connected to the wire 308 through a resistor 310. The positive voltage supply V+ is likewise connected to the input wire 306 through a resistor 312 and into the input wire 308 through a resistor 314. The result of the positive voltage source V+ being connected to the fourth, fifth and sixth NAND gates 294 through 296 is that a logic "one" signal is presented to one input of NAND gates 294 through 296 so long as the switches 38, 46 and 47 are open or in the automatic operational position. Thus, each of the NAND gates 294 through 296 normally have two signals present at their input, a logic "one" from the positive voltage supply V+ and a logic zero from the motor speed sensor controls. The result of this configuration is that the normal output of the NAND gates 294 through 296 is a signal logic "one." The output of the NAND gates 294 through 296 are transmitted on respective output wires 315, 316 and 317 to a seventh NAND gate 320. So long as the output from the three NAND gates 294 through 296 are all a logic "one," the output of the seventh NAND gate 320 will be zero. This indicates a normal operational configuration. However, should one of the drive motors 10 through 12 drop below ten bottles per minute in speed, one of the inputs to the seventh NAND gate 320 will become a logic zero, causing an output of a logic "one" from the seventh NAND gate 320. This is transmitted on an output line 322 to a warning beacon 324. The warning beacon 324 will then be turned on in this case to alert personnel to the occurrence of a loss in speed of one of the inspection machines. Should any of the switches 38, 46 or 47 be closed, it is desired that the beacon 324 not be turned on. It is assumed, in such a case, that a machine operator has closed the switch and is in attendance at the machine and, therefore, does not need the warning afforded by the beacon 324. Thus, when, for example, the switch 38 is closed, the positive voltage source V+ is grounded through the switch 38. This then provides a logic zero signal into the fourth NAND gate 294. However, this does not cause the beacon 324 to be turned on, since the only set of inputs to the NAND gate 294 which can cause the beacon 324 to be turned on is that which occurs when both of the inputs are a logic "one" value. This can occur only when the switch 38 is in the automatic position and when the signal furnished through the input line 210 and as inverted by the inverter 299 is a logic zero on the line 210, indicating a speed of less than 10 bottles per minute of the motor 10. The same logic applies to the fifth and sixth NAND gates 295 and 296, which, as was previously noted, are associated with the drive motors 11 and 12. Whenever one of the inspection machines is placed into the manual operating mode out of the automatic operating mode, it is assumed that the other machines should go into the emergency speed configuration. Therefore, the line 304 is connected to the NAND gate 268 through an electrical line 326 and to the NAND gate 267 through a branch line 327 from the line 326. Thus, so long as the switch 38 is in the automatic position, a logic "one" signal will be furnished to the NAND gates 267 and 268 from the positive voltage supply V+. However, should the switch 38 be closed, thus placing the motor 10 under manual control, this signal will cease and will cause the NAND gates 267 and 268 to switch the motors 11 and 12, which they control, into the emergency operational speed. This wiring configuration provides a means for automatically generating the second or emergency speed signal whenever a machine is placed under manual control. In a similar manner, the line 306 is connected to the NAND gate 268 through a line 330 and to the NAND gate 266 through a branch line 331. Likewise, the line 308 is connected to the NAND gate 267 through a branch line 334 and to the NAND gate 266 through a branch line 335. The final inputs to the NAND gates 266 through 268 are provided through input lines 340 through 342 respectively which are connected to grounded emergency speed test switches 336, 337 and 338 respectively. The grounded emergency speed test switches are designed to allow the operator of the inspection machines to operate the machines in the emergency speed mode at will, in order to set up and test the equipment at the emergency speed setting, by artificially generating the second signal which causes emergency speed operation. It is necessary to make this setting, since the inspection equipment which might function properly at the normal speed setting might require some adjustment to ensure its proper operation in the emergency speed mode. The positive voltage supply V+ is connected into the lines 340 through 342 through respective resistors 344, 345 and 346. the result of this connection is to present a logic "one" signal to the NAND gates 266 through 268 under normal operations. Closing of any one of the switches 366 through 368 grounds the positive voltage supply V+ and thus furnishes a logic zero signal to the NAND gate 266 through 268 whose emergency speed test switch has been closed. In summary, therefore, the NAND gates 266 through 268 will give a logic output which calls for emergency speed operation of one or more machines under any one of three conditions: 1) when any one of the three machines indicates a speed less than 10 bottles per minute; 2) when any one of the three machines is placed into the manual operational mode; or 3) when any one of the three machines is deliberately placed into the emergency speed by the operator closing the emergency speed test switch. In cases 1 and 2, all remaining machines increase in speed. In case 3, only the selected machine increases its speed. As was mentioned previously, in the event that the emergency speed operational condition is entered, it is sometimes necessary to speed up the speed of the outgoing conveyors. In this particular example, all of the outgoing conveyors are driven from a single motor, thus making it necessary only to change the speed setting of the single motor. It would, of course, be possible to control all of the outgoing conveyors independently, thus providing independent leads to the conveyors' motors rather than the single signal as shown in this example. This function is controlled by an eighth NAND gate 348. Inputs to the NAND gate 348 are from the output line 220 by a wire 350 connected between the NAND gate 348 and the wire 220, a wire 351 connecting an input of the NAND gate 348 to the output wire 388, and a wire 352 connecting the output line 290 to an input of the NAND gate 348. These three wires, 350 through 352, will normally furnish a logic "one" signal to the NAND gate 348. This is a normal operational condition of the three machines. A fourth input to the eighth NAND gate 348 is from a grounded conveyor speed test switch 354. This switch 354 is connected to an input of the eighth NAND gate 348 through a wire 355. The positive voltage supply V+ is connected to the wire 355 through a resistor 356. The result of this connection is that so long as the switch 354 is open, a logic "one" signal is furnished to the eighth NAND gate 348. Thus, under normal operational conditions, the eighth NAND gate 348 receives four logic "one" inputs, and, as a result, gives a logic zero output on an output line 358 connected to the conveyor speed control 82. When any one of the four inputs to the eighth NAND gate 348 is a logic zero, the output of the NAND gate 348 to the conveyor control 82 will be a logic "one," thus causing the conveyor speed to switch from the normal output speed to the emergency speed. The conveyor speed test switch 354 allows the operator to test the emergency speed to ensure that it is proper. By closing the switch 354, an artificial logic zero is created at an input terminal to the NAND gate 348 causing the output conveyor from the inspection machines to operate at the emergency speed. This allows observation of the emergency speed and adjustment of it, if necessary.

Figure 7:
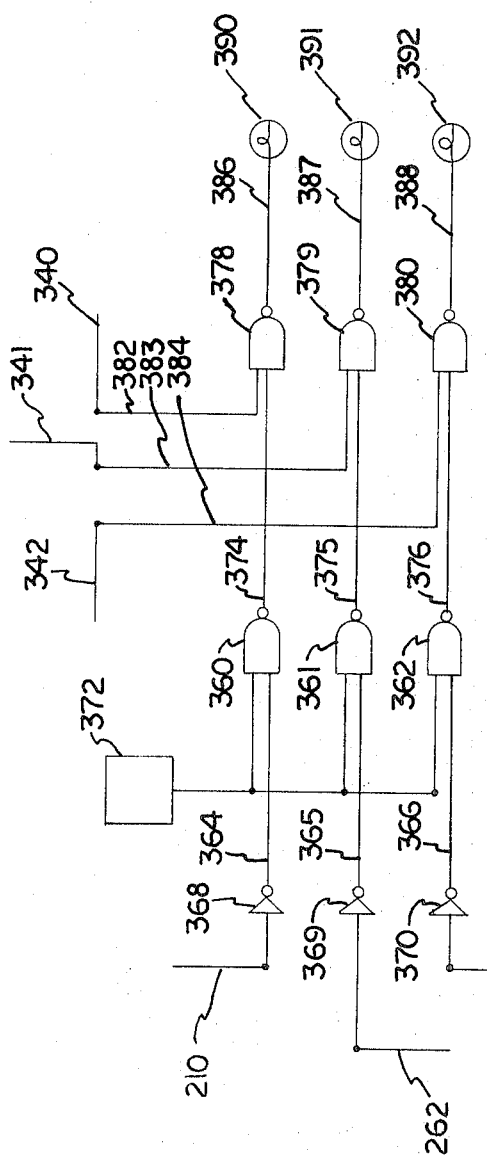
FIG. 7 is a circuit diagram for a visual, malfunction warning unit.

FIG. 7 illustrates a circuit which may be added to the circuit shown in FIG. 6 to provide a visual indication of an emergency situation. Three NAND gates 360 through 362 are connected to the input signal lines 210, 262 and 264 through input wires 364, 365 and 366 respectively. Signal inverters 368, 369 and 370 are inserted in series in the lines 364, 365 and 366. The result of this configuration is that, so long as the normal logic "one" signal is present in the lines 210, 262 and 264, a logic zero signal is presented to the inputs of the three NAND gates 360, 361 and 362. A second input to the NAND gates 360 through 362 is from an oscillator 372, which has a frequency of approximately ½ hertz. The oscillator 372 is connected to one input of all of the NAND gates 360 through 362. Thus, under normal circumstances, a steady logic zero signal is furnished to one input of the NAND gates 360 through 362 and a variable logic signal varying from zero to "one" is presented to the other input terminal. The net result of this is that, under normal circumstances, a steady logic "one" output is presented on output lines 347, 375 and 376. This must be so since, for any combination of one and zero in a NAND gate, the output is a logic "one." The output lines 374 through 376 from the first three NAND gates 360 through 362 are respectively connected to inputs of a fourth, fifth and sixth NAND gates 378, 379 and 380. An additional input to the fourth, fifth and sixth NAND gates 378 through 380 are through wires 382 through 384. The wire 382 is connected to the wire 340, which, in turn, is connected into the emergency test switch 336. The wire 383 is connected to the wire 341, which is connected to the emergency test switch 337. The wire 384 is connected to the wire 342, which is connected to the emergency test switch 338. Thus, normally the fourth through sixth NAND gates 378 through 380 will have, as their input, two logic "one" signals. Therefore, the output of these NAND gates will be a logic zero. This output is transmitted along output wires 386 through 388 to warning lights 390 through 392. If one of the emergency test switches 336 through 338 is closed, a logic zero will appear at one of the inputs of the NAND gates 378 through 380. This, in turn, will cause a logic "one" output from that NAND gate and its light will be illuminated, giving visual indication that a test of the emergency speed capabilities of a particular machine is under way. This will be a steady light, which may be red in color to attract additional attention. On the other hand, returning to the NAND gates 360 through 362, if one of the machines reaches a speed less than 20 bottles per minute, the input to these NAND gates will then become a logic "one." The other input to the NAND gates 360 to 362 is from the oscillator 372. Thus, the other input to these NAND gates 360–362, under such a circumstance, will vary from zero to one. Therefore, the output of the NAND gates 360–362 will be a logic zero for one period of time and a logic "one" for another period of time. This will then cause the light controlled by those NAND gates 360–362 to flash on and off. Therefore, when the machine is under test, the light 390 through 392 will be on in a steady glow, but when a true emergency situation has occurred with the machine speed dropping below 10 bottles per minute, the light will flash on and off to distinguish between these two circumstances. In addition, it must be realized that the flashing light will not occur unless the emergency test switch is off.

Figure 8:
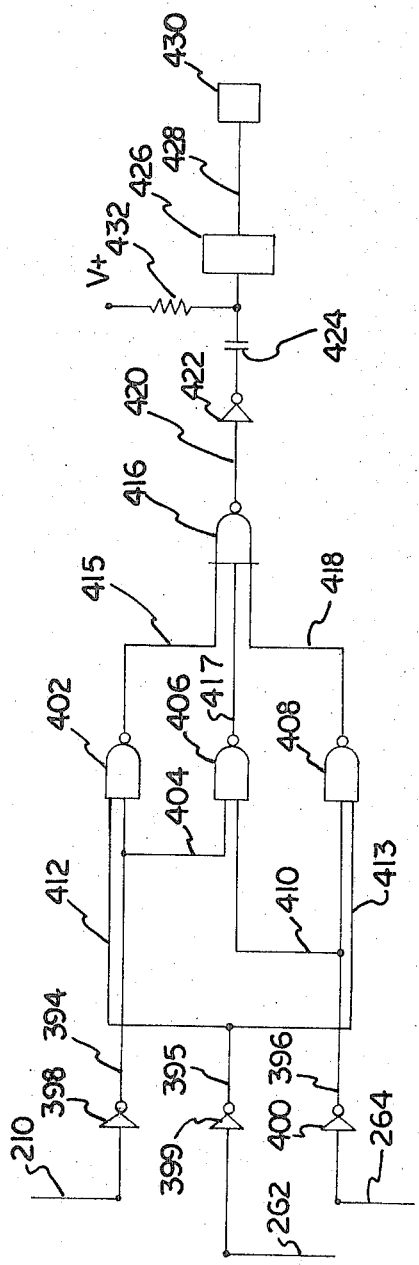
FIG. 8 is a circuit diagram for a unit to warn when two or more of the motors have fallen below minimum operating speed.

FIG. 8 illustrates a circuit which may be used to generate a warning when any two or more of the inspection machines have been stopped, or, more properly, have reached a speed of less than 10 bottles per minute. The electrical lines 210, 262 and 264 which carry the more than ten or less than 10 bottles per minute signal are connected to input lines 394, 395 and 396. Signal inverters 398, 399 and 400 are respectively connected in series with the input lines 394 through 396. The input line 394 is connected to a first NAND gate 402. A branch line 404 connects the input line 394 to a second NAND gate 406. The line 396 is connected to a third NAND gate 408. A branch line 410 connects the input line 396 to the second NAND gate 406. Branch lines 412 and 413 connect the input line 395 respectively to the first NAND gate 402 and the third NAND gate 408. Since the normal operational condition is indicated by a logic "one" on the lines 210, 262 and 264, the signal inverters 398 through 400 present a logic zero signal and a normal operational condition. Therefore, the first NAND gate 402 has, as its normal input, two logic zero signals which indicate the operational status of the motors 10 and 11. The normal output of the first NAND gate 402 is, therefore, a logic "one" which is transmitted on an output line 415 to a fourth NAND gate 416.

The input to the second NAND gate 406 is likewise two logic zero signals in a normal condition indicating the status of the motors 10 and 12. Its normal output is, therefore, a logic "one" which is transmitted through an output line 417 to the fourth NAND gate 416. Similarly, the normal input to the third NAND gate 408 are two logic zero signals indicating the status of the motors 11 and 12. The output of the third NAND gate 408 is thus normally a logic "one" which is transmitted through an output line 418 to the fourth NAND gate 416. It is, therefore, clear that under normal operating conditions, the fourth NAND gate 416 has as its input three logic "one" signals. The input of three logic "one" signals to the fourth NAND gate 416 means that its output will be a logic zero under these circumstances. This logic zero output is transmitted through an output line 420. A signal inverter 422 is connected in series in the output line 420 to invert the logic zero signal to a logic "one." Connected in series in the line 420, after the signal inverter 422, is a capacitor 424. One side of the capacitor 424 is connected to the signal inverter 422 and the other side of the capacitor 424 is connected to a timer 426. An output wire 428 from the timer 246 is connected to a siren unit 430. The positive voltage supply V+ is connected into the line 420 between the capacitor 424 and the timer 426 through a resistor 432. The result of the configuration shown is that the capacitor 424 will normally have both sides held at equal potentials (the V+ value) due to the logic "one" from the signal inverter 422 and the resistor 432; this condition is true when at least two machines are operating properly. When two machines are stopped, the output from the fourth NAND gate 416 will switch to logic "one," thus making the output from the signal inverter 422 a logic zero. This is equivalent to grounding the side of the capacitor 424 adjacent the signal inverter 422. Since the voltage across a capacitor cannot change value instantaneously, the other side of the capacitor 424 will also initially tend to fall, and would, in fact, reach the ground state, were it not for the resistor 432 connected to the V+ supply. The characteristics of the timer 426 are such that it sill be triggered only by a falling wave form. Thus, the initial voltage fall of the side of the capacitor 424 attached to the input of the timer 426 will commence the time period of the timer 426. However, the resistor 432, which may be called a "pullup" resistor for convenience, will tend to keep that side of the capacitor 424 at the V+ potential, even though the other side is at ground. Thus, the net result is that the timer 426 has been activated and will generate a signal on its output line 428. this will turn on the siren 430, giving an audible signal that two machines have been stopped. After a predetermined time, generally in the range of ten seconds, it is assumed that the siren will have attracted attention to the emergency situation and will no longer be needed. At the steady state condition, with the emergency still present, the RC time constant of the resistor 432 and the capacitor 424 has timed out, and the V+ potential or logic "one" is again presented to the timer 426. This will allow the timer 426 to time out and thus turn off the siren 430. The capacitor 424 is fully charged in this state. When the emergency is over, and NAND gate 422 again reverts to the logic "one" state, the input to the timer 426 may momentarily go above the V+ value, but since this is a rising signal, the timer 426 is not activated.

What we claim is:

1. Apparatus for controlling the speed of operation of a plurality of machines which perform substantially identical operations, in a parallel fashion, on a plurality of substantially identical articles which are fed thereto and removed therefrom, comprising:
   a main drive motor for each of said machines;
   an electrically adjustable speed control unit for each of said main drive motors;
   means for sensing the speed of each of said drive motors;
   means for setting a pre-selected mormal operational speed and an emergency operational speed, greater than said normal speed, for each of said drive motors;
   sensing means for sensing when the speed of any one of said drive motors falls below a pre-selected minimum speed value;
   logic means for generating a first signal when all of said sensed speeds are above said pre-selected minimum speed value and for generating a second signal when any one of said sensed speeds is below said per-selected minimum speed value; and
   means, connected to said speed control units, for individually comparing the sensed speed of each of said motors with said normal operational speed when said first signal is present and with said emergency operational speed when said second signal is present and for generating a speed correctional signal to said speed control units whenever said sensed speed varies from said compared preselected speed value.

2. The apparatus of claim 1, wherein each of said main drive motors includes an output shaft which rotates at least once for each article which passes through said machines, and wherein said means for sensing the speed of each of said drive motors comprises, for each of said main drive motors:
   a shaft encoder connected to said output shaft for generating a plurality of pulses for each revolution of said shaft and a single reference pulse at the beginning of each revolution of said shaft;
   a binary coded decimal counter, connected to said plurality of pulses from said shaft encoder for counting said plurality of pulses;
   a quad-latch unit, connected in series with outputs from said binary coded decimal counter, for holding each count presented to it, until cleared, and presenting said held count as a constant output; and
   time base generation means for generating an output signal of a known time duration to turn said binary coded decimal counter on and off in a time span such that the output of said binary coded decimal counter is a value equal to the operational speed of said machine in terms of articles-per-unit time.

3. The apparatus of claim 2, wherein said time base generation means includes:
   a binary counter;
   a free running oscillator, having a fixed oscillation period, connected to an input of said binary counter;
   a first flip-flop having a set terminal, a reset terminal and an output terminal connected to said binary counter;
   means for connecting said single reference pulse from said shaft encoder to the set terminal of said first flip-flop to thereby turn on said binary counter in response to said single reference pulse;

means connecting the reset terminal of said first flip-flop to outputs of said binary counter for turning said flip-flop off when said binary counter reaches its storage capacity;

a NAND gate connected to the output side of said binary counter, said NAND gate giving an output signal when the count held by said binary counter has reached a pre-selected value; and a second flip-flop having a set terminal connected to said binary counter, whereby said second flip-flop will be turned on when a new count begins, a reset terminal connected to an output of said NAND gate, whereby said second flip-flop will be turned off when said preselected value is reached, and an output terminal connected to an input of said binary coded decimal counter to keep said binary coded decimal counter on so long as said second flip-flop is on.

4. The apparatus of claim 2, further including means for clearing said quad latch unit of a previously held speed value to allow acceptance of a new speed value after the expiration of said output signal from said time base generation means.

5. The apparatus of claim 2, further including means for clearing said binary coded decimal counter fager the information therein has been transferred to said quad-latch unit.

6. The apparatus of claim 2, further including means connected to the output of said quad-latch unit for displaying, as a digital decimal number, the operational speed of said machine.

7. The apparatus of claim 2, further including means for sensing when the speed of said machine is zero and clearing said binary coded decimal counter such that it presents an output value of zero.

8. The apparatus of claim 7, wherein said means for sensing when the speed of said machine is zero includes:

a NOR gate having a plurality of input terminals and at least one output terminal connected to said time base generation means;

means for connecting said single reference pulse from said shaft encoder to one input of said NOR gate, whereby said single reference pulse will normally initiate operation of said time base generation means;

a timer, having a time period longer than the time between successive single reference pulses, said timer having an input connected to said single reference pulse to reset said timer upon each occurrence of said single reference pulse;

means for connecting an output of said timer to an input of said NOR gate; and a one-shot device, connected in circuit between said NOR gate and said timer, whereby the absence of said single reference pulse for a period greater than said timer period will allow said timer to generate a single pulse through said NOR gate to cause said time base generation means to activate said binary coded decimal counter for a single counting cycle.

9. The apparatus of claim 2, wherein said sensing means comprises, for each of said machines:

a NAND gate having a plurality of inputs connected to a plurality of outputs from said quad-latch unit and an output connected to said logic means, said plurality of inputs being chosen such that, so long as any one of them is on, said machine is above a specific minimum speed and said NAND gate is on, and when all of said plurality of inputs are off, said machine is below said specific minimum speed and said NAND gate is off.

10. The apparatus of claim 1, wherein said means for comparing the sensed speed of each of said motors comprises, for each of said motors:

a multi-stage binary comparator having inputs from said means for sensing the speed of said drive motor and from said pre-selected normal and emergency speed setting means, and having a motor speed increase output and a motor speed decrease output, each connected to said speed control unit; and switch means, interposed said multi-stage binary comparator and said means for setting said normal and emergency pre-selected speeds, for selectively connecting either said normal set speed or said emergency set speed to said multi-stage binary comparator.

11. The apparatus of claim 10, wherein said menas for setting a pre-selected normal operational speed and an emergency operational speed comprises: a plurality of manually settable decimal-to-binary conversion switches, said normal speed setting using one plurality of siad switches and said emergency speed setting using a second, independent, plurality of said switches; and, wherein said switch means comprises:

a first plurality of NAND gates having their outputs connected to said multi-stage binary comparator and one input of each connected to individual binary outputs from said decimal-to-binary conversion switches for said normal speed setting;

a second plurality of NAND gates having their outputs connected to said multi-stage binary comparator and one input of each connected to individual binary outputs from said decimal-to-binary conversion switches for said emergency speed setting;

means for connecting said first signal from said logic means to a second input of each of said first plurality of NAND gates, thereby causing said first plurality of NAND gates to be on and said compared pre-selected speed value to be said normal operational speed when said first signal is present; and means for connecting said second signal from said logic means to a second input of each of said second plurality of NAND gates, thereby causing said second plurality of NAND gates to be on and said compared preselected speed value to be said emergency operational speed when said second signal is present.

12. The apparatus of claim 1, wherein said logic means includes:

a plurality of NAND gates, equal in number to the number of said plurality of machines, said plurality of NAND gates being individually associated with one of said plurality of machines and havinng an output terminal connected to said means for comparing the sensed speed of the machine with which it is associated; and means for connecting said sensing means for each of said plurality of machines to an input of each one of said plurality of NAND gates, except that the NAND gate associated with a particular machine is not connected to the sensing means for that machine, whereby the output of said plurality of NAND gates will be said first signal when the sensed speed of all of said machines is above said pre-selected minimum value and will be said second signal when any one of said plurality of machines is operating below said pre-selected minimum speed value.

13. The apparatus of claim 12, further including:
means, connected to said logic means, for artificially generating said second signal at the discretion of an operator of said machines to allow selective operation of any one or more of said machines at said emergency operational speed.

14. The apparatus of claim 13, wherein said means for artificially generating said second signal includes:
a voltage supply;
a plurality of grounded, normally open, switches, equal in number to the number of said machines, each of said switches being associated with one of said machines;
electrical conductor means for individually connecting said plurality of normally open switches to an input of that one of said plurality of NAND gates associated with that machine with which said switch is associated; and
a plurality of resistors individually connecting said voltage supply to said electrical conductor means at a location intermediate said plurality of normally open switches and said plurality of NAND gates, whereby said voltage supply will normally furnish a signal to said NAND gates to cause generation of said first signal and closing any one of said normally open switches will ground said voltage supply to cause generation of said second signal by said NAND gate associated with said closed switch.

15. The apparatus of claim 12, further including:
means for selectively interrupting the transmission of correction signals to any one of said speed control units to allow manual speed control by an operator of said machines.

16. The apparatus of claim 15, further including:
means, connected to said logic means, for automatically generating said second signal whenever any one or more of said machines are placed under manual speed control.

17. The apparatus of claim 16, wherein said means for selectively interrupting the transmission of correction signals includes:
a plurality of multiple pole switches, interposed in circuit between said speed control unit and said means for comparing for each of said main drive motors, said switches being closed to allow automatic control of said main drive motors' speed; and manual speed control means, connected to each of said plurality of multiple pole switches, for controlling the speed of any one or more of said main drive motors at the discretion of an operator of said machines when any one or more of said plurality of multiple pole switches is opened.

18. The apparatus of claim 17, wherein said means for automatically generating said second signal includes:
a grounded, normally open pole for each of said plurality of multiple pole switches, said grounded, normally open pole being closed by the opening of said multiple pole switch;
a voltage supply;
electrical conductor means for connecting each of said normally open poles to an input of each one of said plurality of NAND gates, except that the NAND gate associated with a particular machine is not connected to the normally open pole for that machine; and
a plurality of resistors individually connecting said voltage supply to said electrical conductor means at a location intermediate said normally open poles and said plurality of NAND gates, whereby said voltage supply will normally furnish a signal to said NAND gates to cause generation of said first signal and closing said normally open pole will ground said voltage supply to cause generation of said second signal by said NAND gates connected to said normally open pole which is closed.

19. The apparatus of claim 1, further including:
means, connected to said logic means, for artificially generating said second signal at the discretion of an operator of said machines to allow selective operation of any one or more of said machines at said emergency operational speed.

20. The apparatus of claim 19, further including:
means for visually signaling the discretionary operation of one or more of said machines at said emergency operational speed.

21. The apparatus of claim 1, further including:
means for visually and indivually signaling the operation of any one or more of said machines at a speed less than said pre-selected minimum speed.

22. The apparatus of claim 1, further including:
a driven conveyor means for removing articles from said machines; and
means, responsive to said second signal from said logic means, for increasing the speed of said conveyor means when said machines are operating at said emergency operational speed.

23. The apparatus of claim 22, wherein said means for increasing the speed of said conveyor means includes:
a NAND gate having a plurality of input terminals individually connected to an output from said logic means for each of said machines, said NAND gate being off so long as said first signal is present at all of said input terminals and being on when said second signal is present at any one of said input terminals; and
speed control means, connected to an output terminal of said NAND gate, for setting the speed of said conveyor at a first rate of speed when said NAND gate is off and at a second rate of speed, greater than said first rate, when said NAND gate is on.

24. The apparatus of claim 23, further including:
means for artificially generating said second signal at the discretion of an operator of said machines to allow selective operation of said conveyor means at said second rate of speed.

25. The apparatus of claim 24, wherein said means for artificially generating said second signal includes:
a voltage supply;
a grounded, normally open switch;
electrical conductor means for connecting said normally open switch to an input terminal of said NAND gate; and a resistor connecting said voltage supply to said electrical conductor means at a location intermediate said NAND gate, whereby said voltage supply will normally furnish a signal to said NAND gate to allow said NAND gate to be off and closing said normally open switch will ground said voltage supply to cause said NAND gate to be on.

26. The apparatus of claim 1, further including:
means for selectively interrupting the transmission of correction signals to any one of said speed control units to allow manual speed control by an operator of said machines.

27. The apparatus of claim 26, further including:
means, connected to said logic means, for automatically generating said second signal whenever any one or more of said machines are placed under manual speed control.

28. The apparatus of claim 1, further including:
means for signaling the operation of a group of a pre-selected number of said plurality of said machines at a speed less than said pre-selected minimum speed.

29. A speed control system for a plurality of electric motors operating in parallel comprising:
an electrically adjustable speed control unit for each of said motors;
means for sensing the speed of each of said motors;

means for setting a pre-selected first operational speed and a pre-selected second operational speed for each of said motors;
sensing means for sensing when the speed of any one of said motors falls below a pre-selected minimum speed value;
logic means for generating a first signal when all of said sensed speeds are above said pre-selected minimum speed value and for generating a second signal when any one of said sensed speeds is below said pre-selected minimum speed value; and
means, connected to said speed control units, for individually comparing the sensed speed of each of said motors with said first operational speed when said first signal is present and with said second operational speed when said second signal is present and for generating a speed correctional signal to said speed control unit whenever said sensed value varies from said compared preselected speed value.

30. The apparatus of claim 29, wherein each of said motors includes a rotating output shaft, and wherein said means for sensing the speed of each of said motors comprises, for each of said motors:
a shaft encoder connected to said output shaft for generating a plurality of pulses for each revolution of said shaft and a signal reference pulse at the beginning of each revolution of said shaft;
a binary coded decimal counter, connected to said plurality of pulses from said shaft encoder for counting said plurality of pulses;
a quad-latch unit, connected in series with outputs from said binary coded decimal counter, for holding each count presented to it, until cleared, and presenting said held count as a constant output; and
time base generation means for generating an output signal of a known time duration to turn said binary coded decimal counter on and off in a time span such that the output of said binary coded decimal counter is a value equal to the operational speed of said motor in terms of revolutions of said output shaft per-unit time.

31. The apparatus of claim 30, wherein said time base generation means includes:
a binary counter;
a free running oscillator, having a fixed oscillation period, connected to an input of said binary counter;
a first flip-flop having a set terminal, a reset terminal and an output terminal connected to said binary counter;
means for connecting said signal reference pulse from said shaft encoder to the set terminal of said first flip-flop to thereby turn on said binary counter in response to said single reference pulse;
means connecting the reset terminal of said first flip-flop to outputs of said binary counter for turning said flip-flop off when said binary counter reaches its storage capacity;
a NAND gate connected to the output side of said binary counter, said NAND gate giving an output signal when the count held by said binary counter has reached a preselected value; and
a second flip-flop having a set terminal connected to said binary counter, whereby said second flip-flop will be turned on when a new count begins, a reset terminal connected to an output of said NAND gate, whereby said second flip-flop will be turned off when said pre-selected value is reached, and an output terminal connected to an input of said binary coded decimal counter to keep said binary coded decimal counter on so long as said second flip-flop is on.

32. The apparatus of claim 30, further including means for clearing said quad-latch unit of a previously held speed value to allow acceptance of a new speed value after the expiration of said output signal from said time base generation means.

33. The apparatus of claim 30, further including means for clearing said binary coded decimal counter after the information therein has been transferred to said quad-latch unit.

34. The apparatus of claim 2, further including means for sensing when the speed of said motor is zero and clearing said binary coded decimal counter such that it presents an output value of zero.

35. The apparatus of claim 29, wherein said means for comparing the sensed speed of each of said motors comprises, for each of said motors:
a multi-stage binary comparator having inputs from said means for sensing the speed of said motor and from said pre-selected first and second speed setting means, and having a motor speed increase output and a motor speed decrease output, each connected to said speed control unit; and
switch means, interposed said multi-stage binary comparator and said means for setting said first and second pre-selected operational speeds, for selectively connecting either said first set speed or said second set speed to said multi-stage binary comparator.

36. The apparatus of claim 35, wherein said means for setting a pre-selected first operational speed and a second operational speed comprises: a plurality of manually settable decimal-to-binary conversion switches, said first speed setting using one plurality of said switches and said second speed setting using a second, independent, plurality of said switches; and, wherein said switch means comprises:
- a first plurality of NAND gates having their outputs connected to said multi-stage binary comparator and one input of each connected to individual binary outputs from said decimal-to-binary conversion switches for said first speed setting;
- a second plurality of NAND gates having their outputs connected to said multi-stage binary comparator and one input of each connected to individual binary outputs from said decimal-to-binary conversion switches for said second speed setting;
- means for connecting said first signal from said logic means to a second input of each of said first plurality of NAND gates, thereby causing said first plurality of NAND gates to be on and said compared pre-selected speed value to be said first operational speed when said first signal is present; and
- means for connecting said second signal from said logic means to a second input of each of said second plurality of NAND gates, thereby causing said second plurality of NAND gates to be on and said compared pre-selected speed value to be said second operational speed when said second signal is present.

37. The apparatus of claim 30, wherein said sensing means comprises, for each of said motors:
- a NAND gate having a plurality of inputs connected to a plurality of outputs from said quad latch unit and an output connected to said logic means, said plurality of inputs being chosen such that so long as any one of them is on, said machine is above a specific minimum speed and said NAND gate is on and when all of said plurality of inputs are off, said machine is below said specific minimum speed and said NAND gate is off.

38. The apparatus of claim 29, wherein said logic means includes:
- a plurality of NAND gates, equal in number to the number of said plurality of motors, said plurality of NAND gates being individually associated with one of said plurality of motors and having an output terminal connected to said means for comparing the sensed speed of the motor with which it is associated; and
- means for connecting said sensing means for each of said plurality of motors to an input of each one of said plurality of NAND gates, except that the NAND gate associated with a particular motor is not connected to the sensing means for that motor, whereby the output of said plurality of NAND gates will be said first signal when the sensed speed of all of said motors is above said preselected minumum value and will be said second signal when any one of said plurality of motors is operating below said pre-selected minimum speed value.

39. The apparatus of claim 29, further including:
means, connected to said logic means, for artificially generating said second signal at the discretion of an operator of said motors to allow selective operation of any one or more of said motors at said second operational speed.

40. The apparatus of claim 39, further including:
means for visually signaling the discretionary operation of one or more of said motors at said second operational speed.

41. A method for controlling the speed of operation of a plurality of machines which perform substantially identical operations, in a parallel fashion, on a plurality of substantially identical articles which are fed thereto and removed therefrom, the method comprising the steps of:
sensing the speed of operation of each of said machines;
generating an electrical representation of a pre-selected normal operational speed and an independent electrical representation of a pre-selected emergency operational speed, greater than said normal operational speed, for each of said machines;
sensing when the speed of any one of said machines is less than a pre-selected minimum operational speed;
generating a first electrical signal when said sensed speed of all of said machines is above said minimum speed;
generating a second electrical signal when said sensed speed of any one of said machines is less than said minimum speed;
electronically comparing said sensed speed with said pre-selected normal speed when said first signal is present and with said pre-selected emergency speed when said second signal is present; and
generating a machine speed correctional signal whenever said sensed speed varies from whichever one of said pre-selected speeds with which it is compared.

* * * * *